United States Patent
Hanke et al.

(10) Patent No.: US 8,958,507 B2
(45) Date of Patent: Feb. 17, 2015

(54) REUSE OF DIGITAL INTERFACE FOR MULTIPLE COMPONENTS

(75) Inventors: Andre Hanke, Neubiberg (DE); Bernd Adler, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 2151 days.

(21) Appl. No.: 11/845,449

(22) Filed: Aug. 27, 2007

(65) Prior Publication Data

US 2009/0060011 A1 Mar. 5, 2009

(51) Int. Cl.
*H03D 3/24* (2006.01)
*H04B 7/08* (2006.01)
*H04L 25/02* (2006.01)
*H04L 29/08* (2006.01)

(52) U.S. Cl.
CPC .......... *H04B 7/0822* (2013.01); *H04L 25/0264* (2013.01); *H04L 25/0292* (2013.01); *H04L 67/12* (2013.01)
USPC ........... 375/346; 375/316; 375/347; 455/132; 455/504

(58) Field of Classification Search
USPC ............... 375/346, 316, 347; 455/132, 504; 342/357.1, 357.09, 357.13
See application file for complete search history.

(56) References Cited

U.S. PATENT DOCUMENTS

| | | | |
|---|---|---|---|
| 5,940,452 A | 8/1999 | Rich | |
| 6,002,363 A * | 12/1999 | Krasner | 342/357.52 |
| 6,009,130 A | 12/1999 | Lurey et al. | |
| 6,531,982 B1 * | 3/2003 | White et al. | 342/357.46 |
| 7,643,848 B2 | 1/2010 | Robinett | |
| 2004/0229600 A1 * | 11/2004 | Saez et al. | 455/417 |
| 2005/0197079 A1 | 9/2005 | Banister et al. | |
| 2005/0227631 A1 * | 10/2005 | Robinett | 455/83 |
| 2007/0032220 A1 | 2/2007 | Feher | |

FOREIGN PATENT DOCUMENTS

CA 2562053 A1 11/2005

* cited by examiner

*Primary Examiner* — Zewdu Kassa
(74) *Attorney, Agent, or Firm* — Eschweiler & Associates, LLC

(57) ABSTRACT

In one embodiment, a circuit can selectively adjust a current for driving a load. The circuit includes a sensor configured to measure a magnetic field associated with the current and provide a sensor voltage representative thereof. A control circuit is configured to selectively adjust the current as a function of the sensor voltage and a time-varying voltage threshold. Other methods and systems are also disclosed.

12 Claims, 4 Drawing Sheets

US 8,958,507 B2

REUSE OF DIGITAL INTERFACE FOR MULTIPLE COMPONENTS

FIELD OF THE INVENTION

The present invention relates generally to communication systems, and more specifically to circuits and methods for integrating multiple types of application data into a single communication device.

BACKGROUND

As new communication systems are developed, communication devices are being designed that integrate several types of application data into a single portable electronic device. Thus, these advanced communication devices are more convenient than previous generations of communication devices. However, as more applications are integrated into the device, the interfaces between components inside the device tend to become more complex.

One type of application data that a wireless communication device may need to account for arises from multi-paths encountered during communication. FIG. 1 shows communication system 100 where a radio subscriber unit 102 is attempting to transmit a signal to a base station 104. Because of the nature of radio communication, the radio subscriber unit 102 transmits its signal in all directions (e.g., a spherical waveform radiating from the unit's antenna). Along path 106 the signal is transmitted directly from the unit 102 to the base station 104. However, along other paths 108, 110 the signal reflects from terrestrial objects (e.g., buildings, mountains, etc.) or atmospheric conditions (e.g., the ionosphere) before arriving at the base station 104. Because the base station 104 receives the signal along multiple paths 106, 108, 110, the final received signal may suffer from constructive interference, destructive interference, phase shifting, or other signal aberrations.

In some applications, these aberrations cause jitter or ghosting. For example, ghosts 112, 114 may appear when transmissions are reflected. Depending on whether base station 104 or subscriber unit 102 transmits a signal, the ghosts could affect the subscriber unit 102 or base station 104, respectively, that receive the transmitted signal.

Therefore, to meet customers' growing expectations, communication devices and methods are needed to efficiently integrate multiple types of application data into a single communication device, while at the same time accounting for multi-paths.

SUMMARY

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment relates to a circuit for communicating a digital baseband signal. This circuit includes first receiver circuitry for providing first application data and second receiver circuitry for providing second application data. The circuit also includes a frame buffer configured to selectively receive the first application data or the second application data as a function of a control signal. The frame buffer facilitates the presentation of the selectively received data to a digital baseband processor via a common digital interface.

The following description and annexed drawings set forth in detail certain illustrative aspects and implementations of the invention. These are indicative of but a few of the various ways in which the principles of the invention may be employed.

DETAILED DESCRIPTION

The present invention will now be described with respect to the accompanying drawings in which like numbered elements represent like parts. The figures and the accompanying description of the figures are provided for illustrative purposes and do not limit the scope of the claims in any way.

Figure 1:
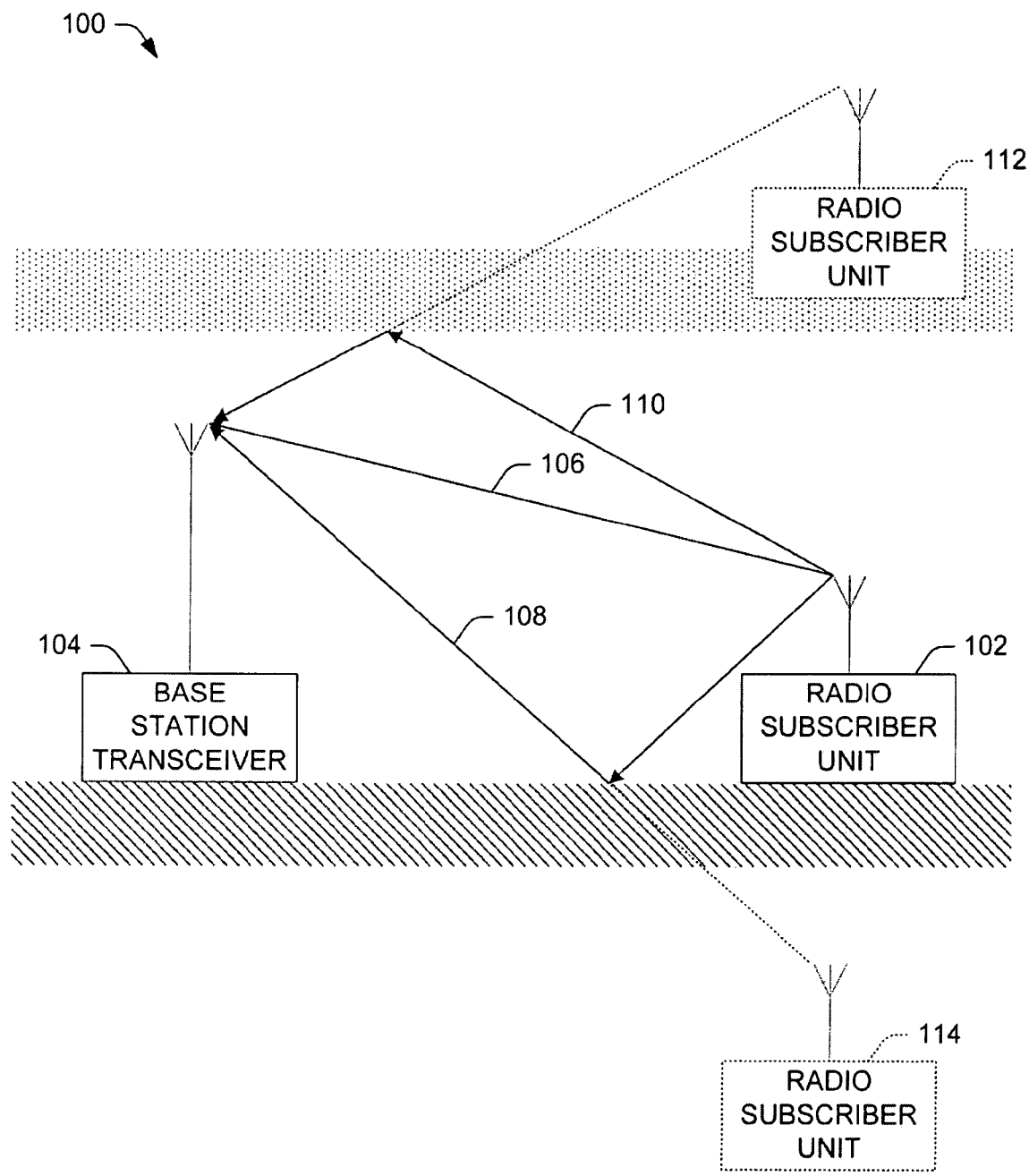
FIG. 1 is a block diagram of one embodiment of a communication system affected by multi-path.
Figure 2:
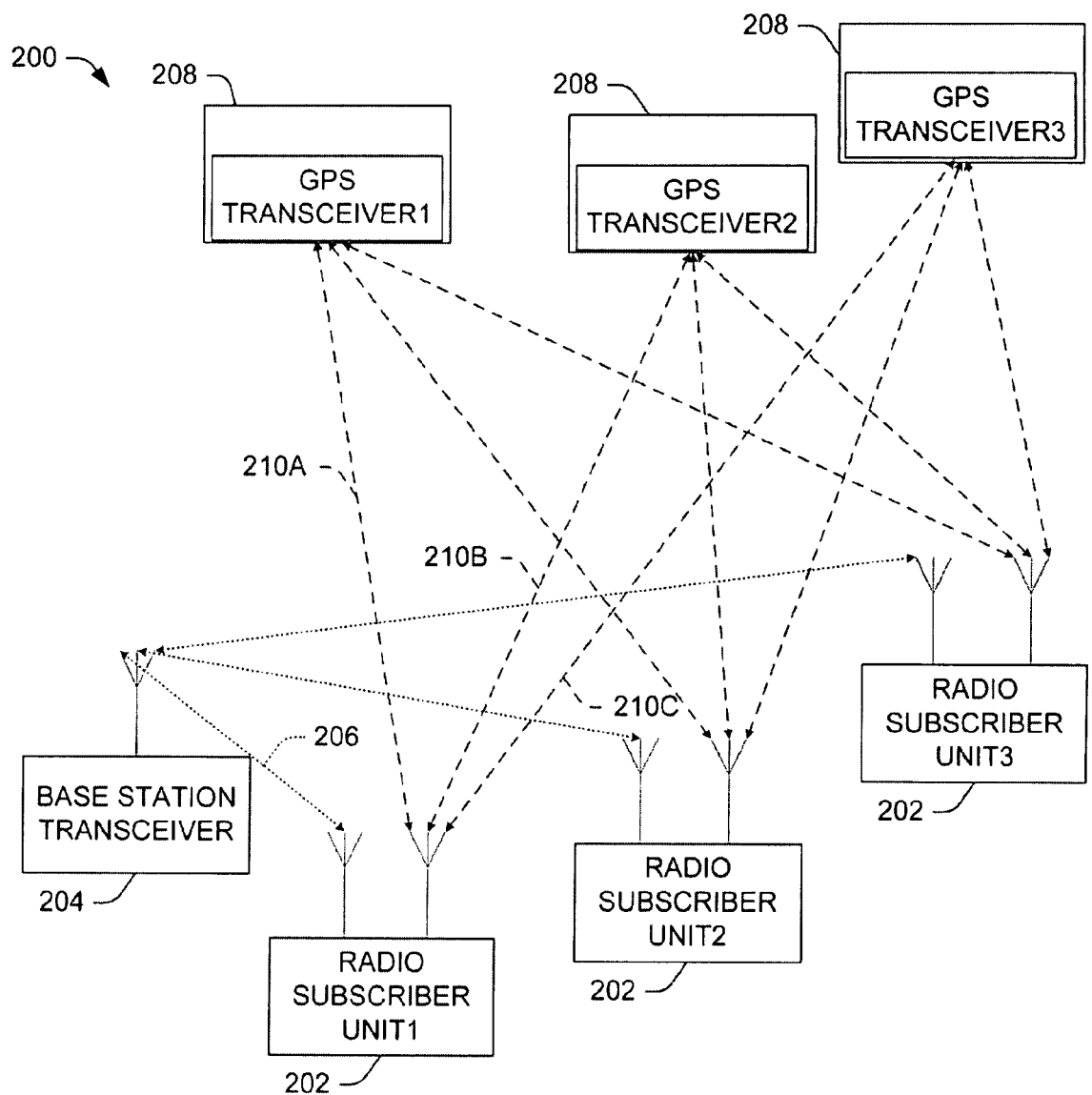
FIG. 2 is a block diagram of one embodiment of a communication system.

FIG. 2 shows a communication system 200 that includes a number of radio subscriber units 202. In one embodiment, each radio subscriber unit 202 could be a cellular phone, although other radio subscriber units could be pagers, personal digital assistants (PDAs), etc. For purposes of illustration, several types of application data are now discussed below with reference to FIG. 2. It will be appreciated, however, that these types of application data are only included for purposes of illustration and that aspects of the invention are applicable to any type of application data. After this brief discussion, a more detailed discussion of a communication device that can integrate several types of application data is discussed with reference to FIGS. 3-4.

Referring now to FIG. 2, one can see a communication system with a number of radio subscriber units 202 that could each include several transceivers for providing access to several different types of application data. Because the different types of application data could often be communicated over different frequency ranges (or have other distinguishing characteristics), each transceiver could be specifically configured to provide access to a different type of application data.

One type of application data that a radio subscriber unit 202 could use is cellular data. The radio subscriber unit 202 could include a cellular transceiver configured to exchange this cellular data with a cellular base station transceiver 204. For example, RadioSubscriberUnit1 is shown exchanging cellular signals 206 with the base station. Depending on the implementation, these cellular signals could be structured in accordance with code-division multiple access (CDMA) or time-division multiple access (TMDA) schemes, for example. In one embodiment, the cellular signals could be structured in accordance with Global System for Mobile Communications (GSM) or Universal Mobile Telecommunication System (UMTS) standards, but in other embodiments could be used in accordance with other standards.

In addition to exchanging cellular signals, the radio subscriber units 202 could also include a global positioning system (GPS) transceiver to receive GPS data from several satellites 208. Thus, RadioSubscriberUnit1 is shown receiving GPS data signals 210A, 210B, 210C from three satellites' transceivers (GPSTransceiver1, GPSTransceiver2, GPSTransceiver3, respectively). Assuming RadioSubscriberUnit1 can connect with a sufficient number of satellites, the unit should be able to use the GPS data to determine the unit's precise latitude and longitude on the surface of the earth.

To mitigate the effects of multi-path, the radio subscriber units 202 may also include a diversity receiver that develops information from several signals transmitted over independent fading paths. Often, such a diversity receiver includes at least two antennas and employs a diversity scheme to mitigate multi-path effects. Illustrative diversity receivers could use one of several types of diversity schemes, including but not limited to: space diversity, polarization diversity, angle diversity, frequency diversity, and/or time diversity.

In one embodiment, separate receivers could be used for each type of application data (e.g., a cellular transceiver for cellular data, a GPS receiver for GPS data, a diversity receiver for diversity data, etc.). In such an embodiment, however, several challenges arise from trying to integrate the receivers associated with these applications into a single communication device. For example, because these receivers often interface to a single baseband integrated circuit, the addition of multiple receivers leads to complex interfaces between various circuits within the communication device. This ultimately leads to higher costs for the communication devices.

Figure 3:
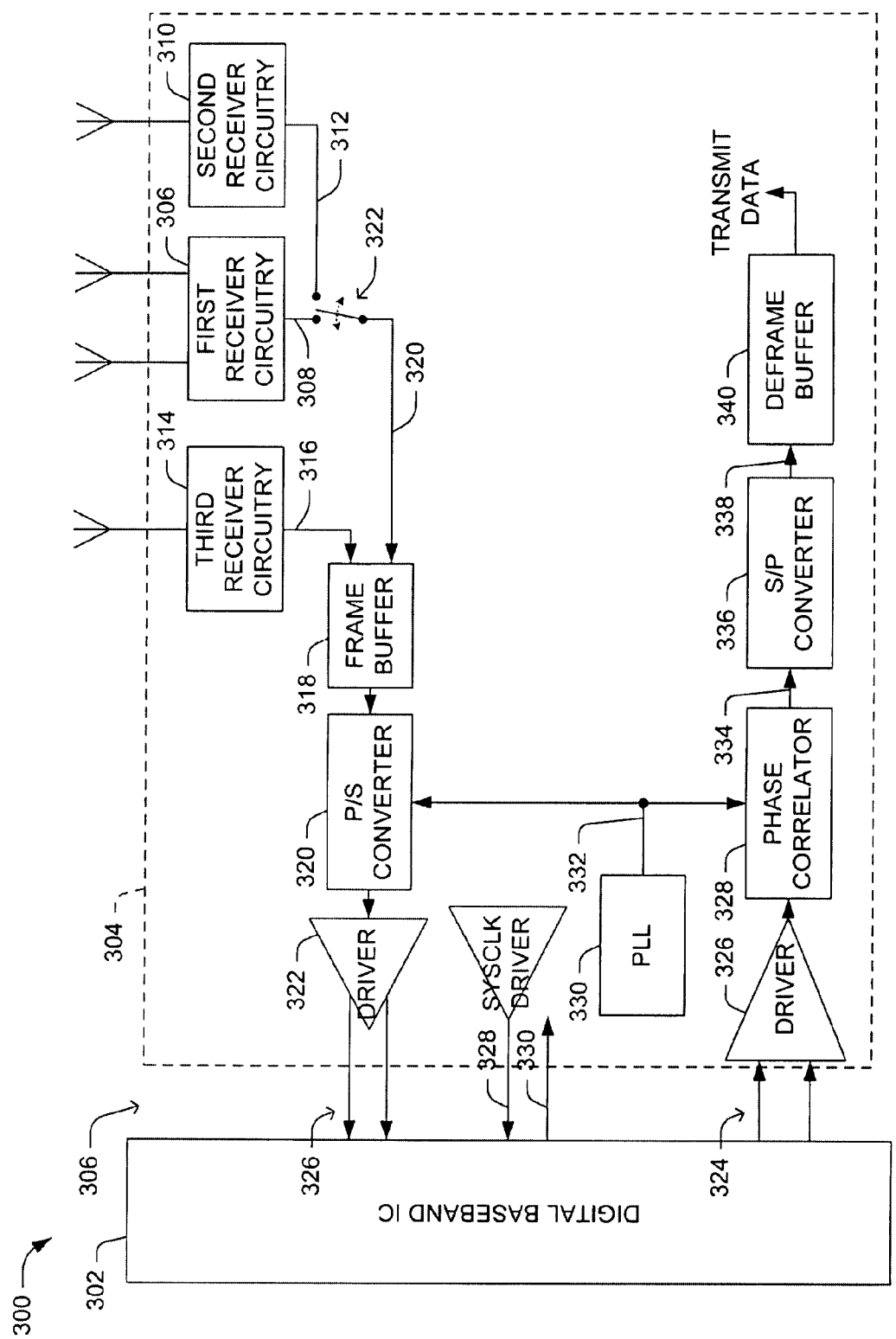
FIG. 3 is a block diagram of one embodiment of a communication device, such as a radio subscriber unit.

FIG. 3 shows one communication device 300 that can effectively integrate several types of application data. In one embodiment the communication device could be a radio subscriber unit (e.g., radio subscriber unit 202), but in other embodiments it could be some other communication device. The communication device 300 includes a digital baseband integrated circuit (IC) 302 that is coupled to a radio frequency circuit 304 via a common digital interface 306.

The radio frequency circuit 304 includes several receivers, each of which may be used to communicate a different type of application data. The receivers, which are configured to receive data, may be part of respective transceivers, which are configured to both receive and transmit data. In FIG. 3's illustrated embodiment, the radio frequency circuit 304 includes a first receiver 306 that provides first application data 308, a second receiver 310 that provide second application data 312, and a third receiver 314 that provides third application data 316. In one embodiment, the first receiver 306 could be used to receive diversity data, the second receiver 310 could be used to receive GPS data, and the third receiver 314 could be used to receive cellular data.

The receivers may be coupled to a frame buffer 312, which selectively receives either the first data 308 or the second data 312 via a selected path 320 as a function of a control signal. This control signal (which could control a switching element 322 such as a multiplexor, switch, etc.) could be based on whether data has been received at the first or second receiver. If data is received exclusively at the first receiver 306, the selected data 320 could be the first application data 308. By contrast, if data is received exclusively at the second receiver 310, the selected data 320 could be the second application data 312. If data is received at both the first and second receivers, the selected data 320 could be based on a priority assigned to the first and second receivers. This priority could be based, for example, on the bandwidths associated with the first and second application data, quality of service (QoS) requirements for the first and second application data, or other considerations.

In the illustrated embodiment, the frame buffer 318 could continuously receive the third application data 316 from the third receiver 314. If the third application data 316 is cellular data, this embodiment would offer a benefit in that the communication device could receive cellular data in parallel with the selected data 320. Thus, in one embodiment, a customer using the communication device in an unfamiliar town could simultaneously use cellular data to carry on a conversation while using GPS data to navigate.

The frame buffer 318 could include several FIFOs or other memory elements for receiving the various types of application data. In one embodiment, one FIFO could be associated with the selected data 320 and another FIFO could be associated with the third application data 316. Thus, the frame buffer 318 can manage the FIFOs to determine when a given type of application data should be transmitted in packet format across the common interface 306 to the baseband IC 302. In other embodiments, separate FIFOs could be associated with each of the receivers.

Depending on the implementation, a parallel to serial converter 320 may be used in conjunction with an output driver 322 to present the application data over the common interface 306 to the baseband IC 302. In some embodiments, the data transmitted across the common interface 306 may include header information that allows the base band IC 302 to distinguish between the various types of application data.

In the illustrated embodiment, the common digital interface 306 of the baseband IC includes transmit data pins 324, receive data pins 326, a system clock pin 328, and a system clock enable pin 330. The system clock enable pin 330 may be used to aid low-power considerations. These pins could be coupled to corresponding pins on the radio frequency circuit 304 to allow signals to pass between the baseband IC 302 and the radio frequency circuit 304. Depending on the implementation, application data could be communicated in parallel or in serial over the transmit and receive data pins 324, 326.

To transmit various types of application data, the radio frequency circuit 304 may receive data from the baseband IC 302 over the transmit pins 324 and ultimately present this data to one or more transmitters (not shown). The transmitters may be integrated into the receivers (i.e., may be transceivers that can bi-directionally communicate data), or may be standalone transmitters.

After the radio frequency circuit 304 receives the data to be transmitted from the baseband IC 302, the data may pass through an input driver 326 to a phase correlator 328. The phase correlator 328 may work in conjunction with the phase-locked loop (PLL) 330 to ensure that the received data and transmitted data are suitably in-phase with one another. The PLL 330 provides a reference signal 332 that is locked to the phase of the input clock signal or to the phase of a suitable received data signal. The phase correlator 328 uses this reference signal to provide re-timed data 334 to be transmitted.

After the re-timed data 334 leaves the phase correlator, it may be processed by a serial to parallel converter 336. Lastly, the re-timed data 338 may be processed by a deframe buffer 340 that sends the various application data signals to the proper transmitters.

Now that some aspects of data communication have been discussed, some other structural features are set forth.

In some embodiments, the first and second receivers may share circuit elements. For example, in an embodiment where the first receiver is a diversity receiver and the second receiver is a GPS receiver, the receivers may share one or more components. For example, typical blocks that may be reused in such receiver devices are a mixer which may be fed by different LNA's for different standards, a baseband filter may be switched in between different modes and thus can be also reused, as well as ADCs for the received signal and the digital signal processing path.

In various embodiments, some components within the radio frequency circuit may be formed in a single integrated circuit. In one embodiment, the entire radio frequency circuit may be formed within a single integrated circuit. This integrated radio frequency circuit can be manufactured at a significant cost savings compared to other solutions where the components are formed on separate integrated circuits and then coupled together on a circuit board.

Figure 4:
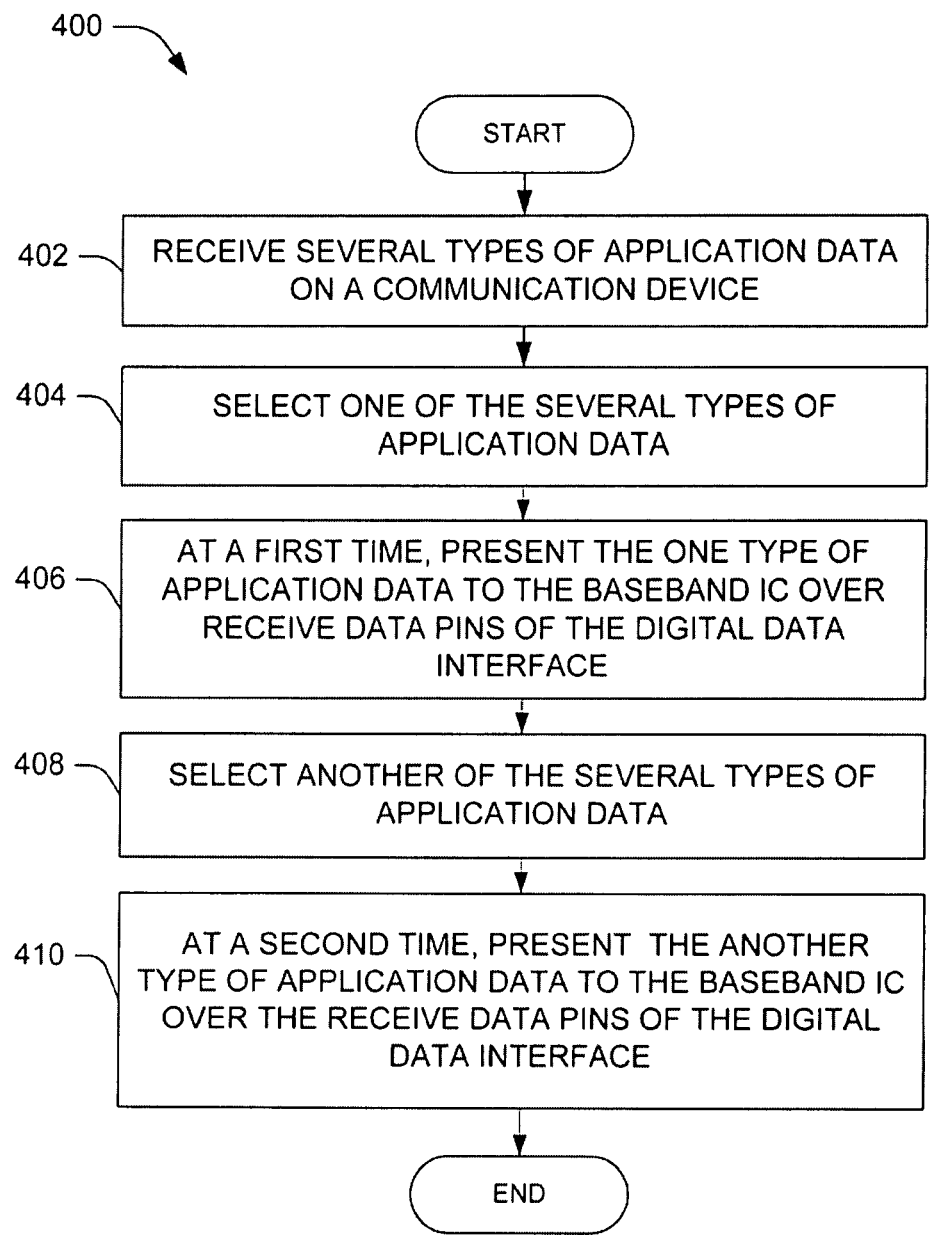
FIG. 4 is a flow chart of one method for communicating with a baseband integrated circuit over a digital interface.

In addition to or in substitution of one or more of the illustrated components, the illustrated communication system and other systems of the invention include suitable circuitry, state machines, firmware, software, logic, etc. to perform the various methods and functions illustrated and described herein, including but not limited to the methods described below (e.g. method 400 of FIG. 4). While the method 400 and other methods are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated actions may be required to implement a methodology in accordance with the invention.

At block 402, several types of application data are received on a radio frequency circuit. These types of application data could include those described above as well as other suitable wireless or wireline applications.

At block 404, one of the several types of application data is selected.

At block 406, at a first time the selected application data is presented to a baseband IC over receive data pins of a digital data interface.

At block 408, another of the several types of application is selected.

At block 410, at a second time the another selected application data is presented to the baseband IC over the receive data pins of the digital data interface.

Although the invention has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising." To the extent the term "communicate" or derivatives thereof are used, such term is intended to encompass numerous scenarios, including but not limited to: only transmitting a signal to at least one component, only receiving a signal from at least one component, or transmitting signals to at least one component and receiving signals from at least one component.

What is claimed is:

1. A circuit for communicating a digital baseband signal, comprising:
    first receiver circuitry for providing first application data;
    second receiver circuitry for providing second application data;
    a frame buffer configured to selectively receive the first application data or the second application data as a function of a control signal, and to facilitate the presentation of the selectively received data to a digital baseband processor via a common digital interface; and
    third receiver circuitry configured to continuously provide third application data to the frame buffer in parallel with the selectively received data,
    where the frame buffer has at least one FIFO associated with the selectively received data and at least another FIFO associated with the third application data.

2. The circuit of claim 1, where the first receiver circuitry comprises diversity receiver circuitry configured to analyze signals from several independent fading paths.

3. The circuit of claim 1, where the second receiver circuitry is configured to communicate global positioning data.

4. The circuit of claim 3 where the first receiver circuitry is configured to analyze signals from several independent fading paths.

5. The circuit of claim 4, where the first and second receiver circuitry share circuit elements.

6. The circuit of claim 1, where the control signal is selectively asserted as a function of whether the first application data is received at the first receiver circuitry or the second application data is received at the second receiver circuitry.

7. The circuit of claim 6, where if both first and second application data are received concurrently, the control signal is asserted as a function of a priority between the first application data and the second application data.

8. The circuit of claim 1, where the frame buffer is configured to manage the FIFOs to send packets of data over the common interface to the digital baseband processor.

9. The circuit of claim 1, where the frame buffer is configured to send header information in packets associated with the selectively received data to distinguish between the first application data and the second application data.

10. The circuit of claim 1, where the first receiver circuitry, the second receiver circuitry, the third receiver circuitry, and the frame buffer are formed within a single integrated circuit that can be coupled to the digital baseband processor via the common digital interface.

11. The circuit of claim 1, further comprising a parallel to serial converter configured to communicate application data to the digital baseband processor in serial.

12. The circuit of claim 1, further comprising a phase locked loop configured to ensure that data received at the baseband processor and data transmitted from the baseband processor are in phase with one another.

* * * * *